(12) United States Patent
Koenen et al.

(10) Patent No.: US 10,996,724 B2
(45) Date of Patent: May 4, 2021

(54) PROVIDING POWER TO A SERVER

(71) Applicant: HEWLETT PACKARD ENTERPRISE DEVELOPMENT LP, Houston, TX (US)

(72) Inventors: David Koenen, Cypress, TX (US); Charles L Hudson, Round Rock, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 312 days.

(21) Appl. No.: 15/745,991

(22) PCT Filed: Jul. 21, 2015

(86) PCT No.: PCT/US2015/041362
§ 371 (c)(1),
(2) Date: Jan. 18, 2018

(87) PCT Pub. No.: WO2017/014758
PCT Pub. Date: Jan. 26, 2017

(65) Prior Publication Data
US 2018/0210524 A1 Jul. 26, 2018

(51) Int. Cl.
*G06F 1/00* (2006.01)
*G06F 1/26* (2006.01)
*H04L 12/10* (2006.01)
*H04L 29/08* (2006.01)
*G06F 9/4401* (2018.01)

(52) U.S. Cl.
CPC ............... *G06F 1/26* (2013.01); *H04L 12/10* (2013.01); *G06F 9/4418* (2013.01); *H04L 67/34* (2013.01)

(58) Field of Classification Search
CPC ........................................................ G06F 1/26
See application file for complete search history.

(56) References Cited

U.S. PATENT DOCUMENTS

| 7,903,809 | B2 | 3/2011 | Karam | |
|---|---|---|---|---|
| 8,930,647 | B1* | 1/2015 | Smith | G06F 9/44557 711/154 |
| 2005/0166213 | A1* | 7/2005 | Cromer | H04L 12/12 719/315 |
| 2006/0089230 | A1* | 4/2006 | Biederman | H04L 12/10 477/34 |
| 2006/0164062 | A1 | 7/2006 | Stineman | |
| 2007/0220618 | A1 | 9/2007 | Holmes et al. | |

(Continued)

FOREIGN PATENT DOCUMENTS

WO WO-2006-081043 A2 8/2006

OTHER PUBLICATIONS

4 Ports PoE Long Distance Ethernet Switch, (Web Page), Nov. 24, 2013, 4 Pages.

(Continued)

*Primary Examiner* — Mohammed H Rehman
(74) *Attorney, Agent, or Firm* — Park, Vaughan, Fleming & Dowler LLP

(57) ABSTRACT

Providing power to a server includes a switch with power sourcing equipment (PSE) and a server with a network interface controller (NIC) the PSE to transfer power to the NIC of the server via a network cable to change configuration settings prior to the server booting from a stand-by mode.

14 Claims, 7 Drawing Sheets

(56) References Cited

U.S. PATENT DOCUMENTS

| | | | |
|---|---|---|---|
| 2010/0011202 A1* | 1/2010 | Murawski | G06F 9/441 |
| | | | 713/2 |
| 2010/0052421 A1* | 3/2010 | Schindler | H02J 1/14 |
| | | | 307/35 |
| 2010/0169589 A1* | 7/2010 | Jalali | G06F 11/2071 |
| | | | 711/162 |
| 2010/0250914 A1 | 9/2010 | Abdul et al. | |
| 2011/0078299 A1* | 3/2011 | Nagapudi | H04L 12/12 |
| | | | 709/223 |
| 2011/0125341 A1 | 5/2011 | Heath et al. | |
| 2012/0120306 A1 | 5/2012 | Schindler et al. | |
| 2012/0239945 A1 | 9/2012 | Balasubramanian et al. | |
| 2013/0117581 A1* | 5/2013 | Katkade | H04L 12/10 |
| | | | 713/300 |
| 2014/0258738 A1* | 9/2014 | Greenwalt | G06F 1/3206 |
| | | | 713/300 |
| 2014/0348160 A1 | 11/2014 | Robitaille et al. | |
| 2016/0170923 A1* | 6/2016 | Kutch | G06F 13/4282 |
| | | | 710/313 |
| 2016/0266637 A1* | 9/2016 | Butcher | G06F 1/3209 |

OTHER PUBLICATIONS

PCT/ISA/KR, International Search Report and Written Opinion, dated Apr. 21, 2016, PCT/US2015/041362, 14 pages.

\* cited by examiner

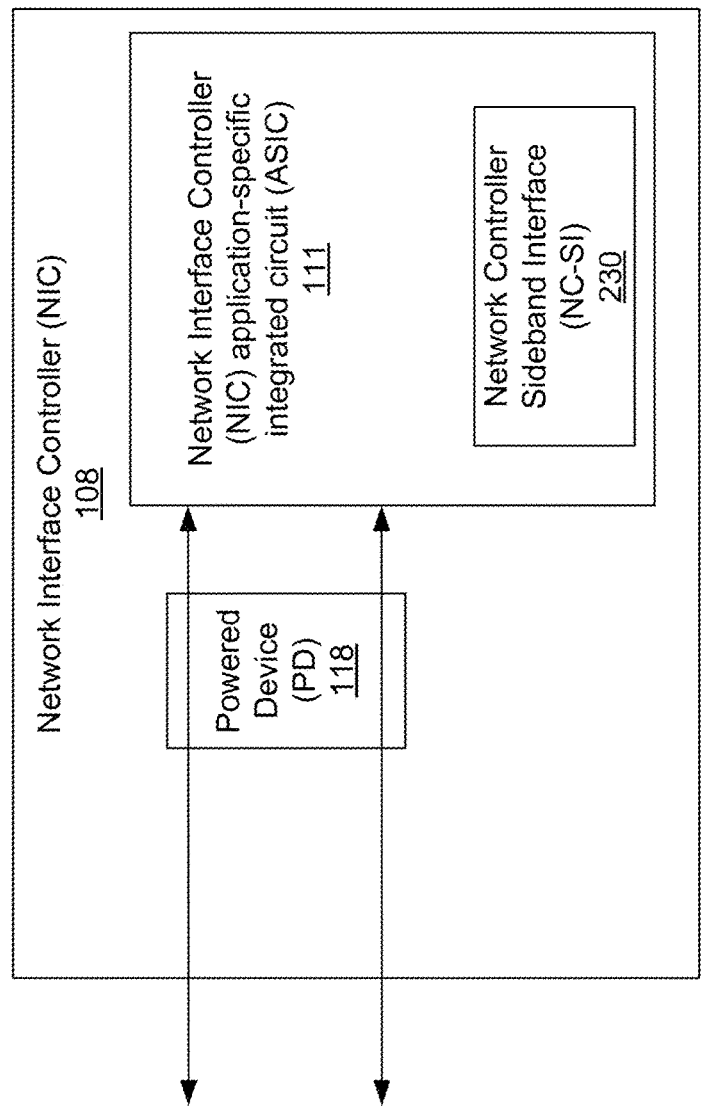

PROVIDING POWER TO A SERVER

BACKGROUND

A network includes a number of user devices, servers and switches. The user devices, servers and switches may be connected to each other. By connecting the user devices, servers and switches to each other, the user devices and the servers may exchange data in the form of packets. Further, the user devices and the servers may share hardware resources to maximize computing power.

BRIEF DESCRIPTION OF THE DRAWINGS

The accompanying drawings illustrate various examples of the principles described herein and are a part of the specification. The examples do not limit the scope of the claims.

FIG. 2A is a diagram of a NIC, according to one example of principles described herein.

Throughout the drawings, identical reference numbers designate similar, but not necessarily identical, elements.

DETAILED DESCRIPTION

Figure 1A:
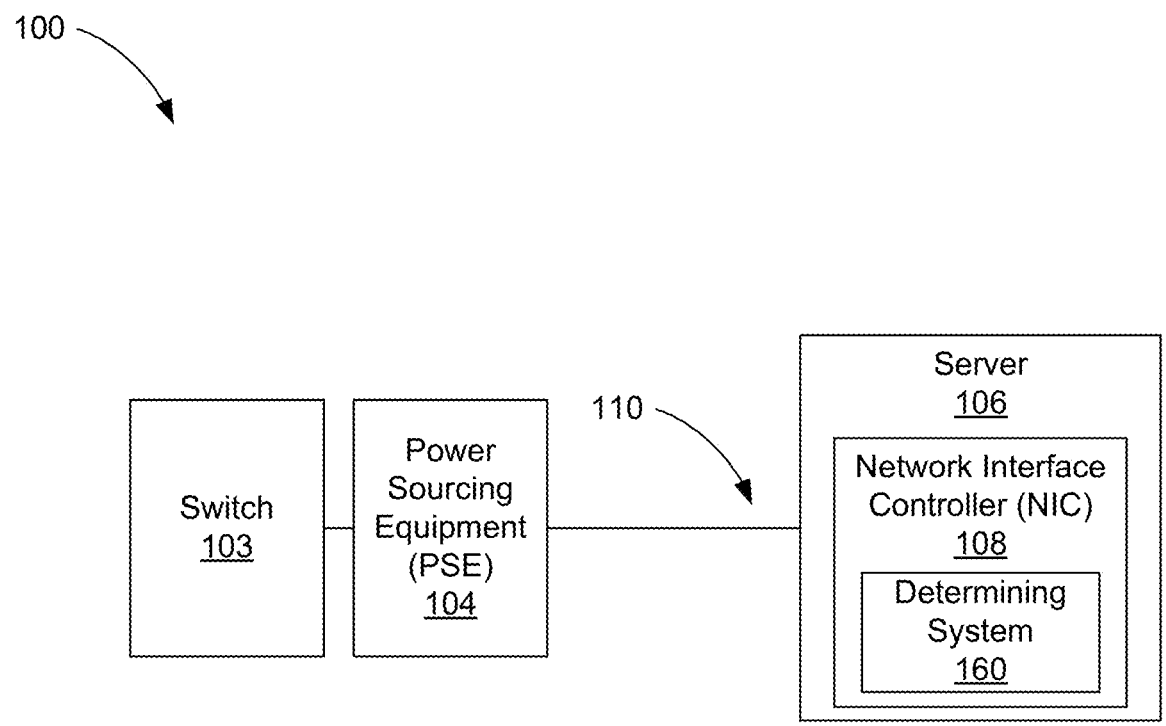
FIG. 1A is a diagram of a system for providing power to a server's network interface controller (NIC), according to one example of principles described herein.

As mentioned above, a network includes a number of user devices, servers and switches. The servers may be running instances of applications capable of accepting requests from a user device and giving responses accordingly. Often, the servers are powered off or are in a stand-by mode. When the servers are powered off or are in the stand-by mode, the servers reboot in order to apply a number of configuration settings before accepting requests from the user devices and giving responses accordingly.

While the servers are in stand-by mode, peripheral component interconnect express (PCIe) slots and/or open compute platform (OCP) connectors do not provide sufficient power to a network interface controller (NIC) on the servers to link on both primary ports, the network controller sideband interface (NC-SI) port, and to be discovered or apply configuration settings. As a result, the servers are rebooted again to apply the number of configuration settings. This may cause a delay in accepting requests from the user devices and giving responses accordingly.

The principles described herein include a system and a method for providing power to a server. Such a system and a method includes a switch with power sourcing equipment (PSE) and a server with a NIC. The PSE to transfer power to the NIC of the server via a network cable to change configuration settings prior to the server booting from a stand-by mode. Such a system allows power to be provided to the NIC without special modifications or power cables form a system board to the NIC. As a result, by using power over Ethernet (PoE) techniques, the switch can supply enough power via PoE to the NIC using the network cable to change configuration settings. Further, the NIC transitions to PCI-express power rails when the server is fully powered up.

In the present specification and in the appended claims, the term "PoE" means a standardized or ad-hoc system which pass electrical power along with data on Ethernet cabling or a network cable such as a twisted pair or twinaxial cable. This allows a single cable to provide both data connection and electrical power to devices, such as a NIC.

In the present specification and in the appended claims, the term "PSE" means a device that provides power over a network cable such as a twisted pair or twinaxial cable. As will be described in other parts of this specification the PSE may be circuit.

In the present specification and in the appended claims, the term "powered device (PD)" means circuitry that is used to extract power from a PSE and provide the power to selected NIC components and portions of the application-specific integrated circuit (ASIC). The PD may receive PoE a switch's PSE via a network cable.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1A is a diagram of a system for providing power to a server's NIC, according to one example of principles described herein. As will be described below, the system includes a switch with PSE and a server with a NIC. The PSE of the switch transfers power to the NIC of the server via a network cable to change configuration settings prior to the server booting from a stand-by mode.

As illustrated, the system (100) includes a switch (103). As will be described in FIG. 1B, the switch (103) may be part of networking equipment. The switch (103) may be a networking device that connects devices together on a network by using packet switching to receive, process, and forward data to a destination device. Further, the switch (103) forwards data to one or multiple devices that need to receive it, rather than broadcasting the same data out of each of its ports. As will be described in other parts of this specification, the switch (103) may be a top of rack (ToR) switch.

Further, the system (100) may include PSE (104). Although the PSE (104) is illustrated separate from the switch (103) in FIG. 1A, the switch (103) may include the PSE (104). As will be described in FIG. 1B, the PSE (104) may be part of networking equipment. The PSE (104) may provide PoE via a network cable (110) to a NIC (108) on a server (106). More information about the PSE (104) will be described in other parts of this specification.

The system (100) may further include the server (106). The server (106) may be a generic server that uses industry standard PCIe slot or OCP mezzanine slots. The server (106) may be a running instance of an application capable of accepting requests from user devices and giving responses accordingly. Further, the server (106) facilitates the user devices to share data, information, or hardware resources. Further, the server (106) may be connected to the user devices via a network. As a result, the server (106) provides an essential service across a network to private users inside a large organization or to public users.

Further, the server includes the NIC (108). As will be described in other parts of this specification, the NIC (108) may be a computer hardware component that connects a computer, such as the server (106), to a network. The NIC (108) implements electronic circuitry needed to communicate using a specific physical layer and data link layer standard such as Ethernet, Fibre Channel, or Token Ring.

The system (100) further includes the network cable (110). The network cable (110) is connected between the PSE (104) of the switch (103) and the server (106). In one example, power such as PoE from the PSE (104) of the switch (103) is transferred to the NIC (108) of the server (106) via the network cable (110). As will be described in other parts of this specification, the NIC (108) temporarily uses a PD to extract PoE power to support link on its NIC ports the NC-SI port to an external 100Base-T physical layer (PHY), and a NIC application-specific integrated circuit's (ASIC) embedded management processor for discovery and to change of the configuration settings. In some examples, a determining system (160) may determine when the PSE (104) is to transfer power to the NIC (108) of the server (106) via the network cable (110) to change configuration settings prior to the server (106) booting from a stand-by mode. Although not illustrated, the determining system (160) includes a processor and computer program code. The computer program code is communicatively coupled to the processor. The computer program code causes the processor to execute the designated function described above. Such a system (100) allows PoE to provide more power to the NIC (108) than a standard PCIe or OCP slot can provide without special modifications or power cables from the system board to the NIC (108). As a result, by using PoE techniques, the switch (103) can supply PoE to the NIC (108) via the network cable (110). This allows the NIC (108) to link and communicate while the server (106) is in stand-by power mode to apply configuration settings. Further, the NIC (108) transitions to PCI-express power rails when the server (106) is fully powered up. More information about the system (100) will be described later on in this specification.

While this example has been described with reference to the system including one switch to transfer PoE to the NIC via one network cable, the system may include several switches and several network cables. For example, the system may include two switches and four network cables.

Figure 1B:
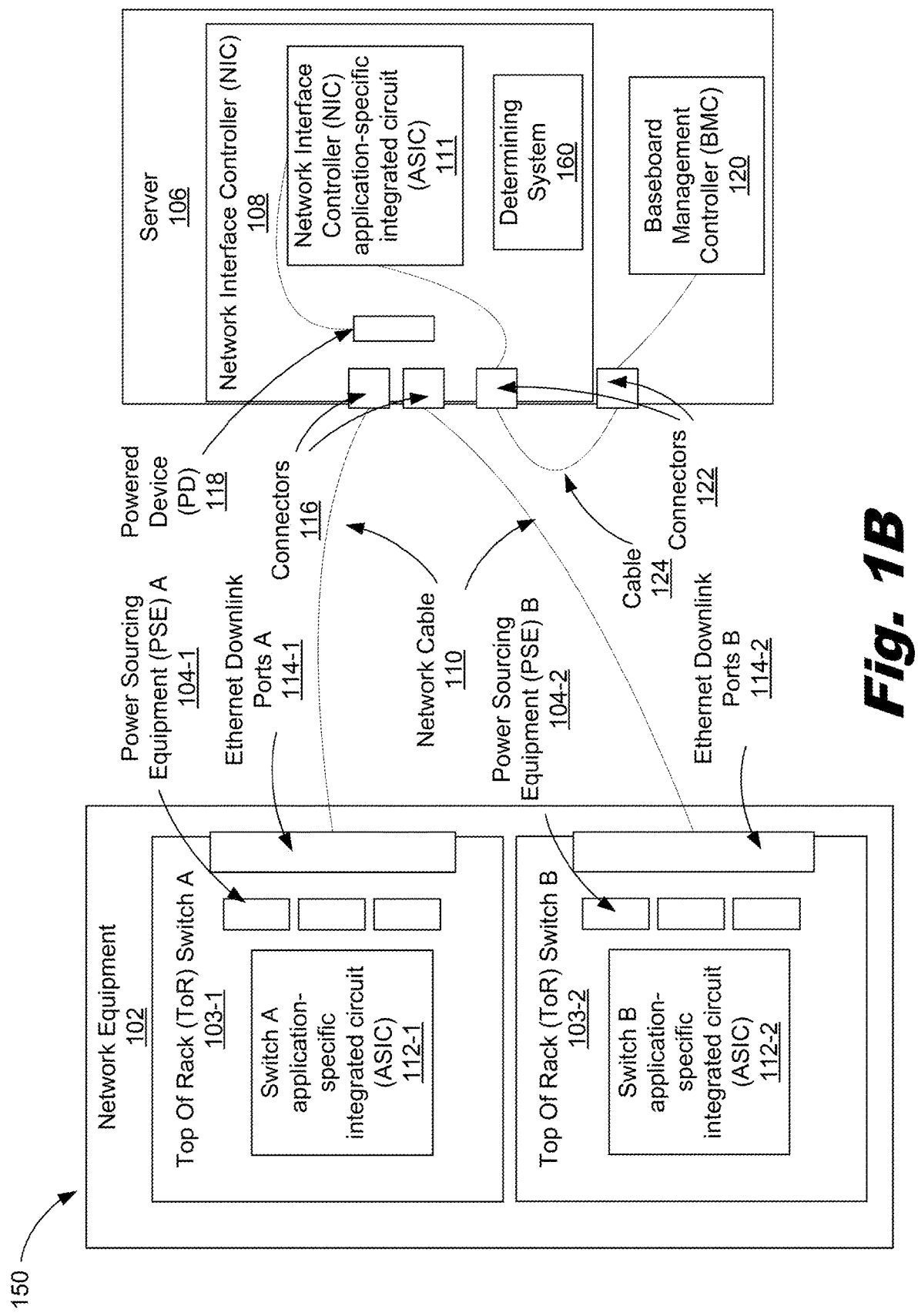
FIG. 1B is a diagram of a system for providing power to a server's NIC, according to one example of principles described herein.

FIG. 1B is a diagram of a system for providing power to a server's NIC, according to one example of principles described herein. As will be described below, the system includes a switch with PSE and a server with a NIC. The PSE of the switch transfers power to the NIC of the server via a network cable to change configuration settings prior to the server booting from a stand-by mode.

As illustrated, the system (150) includes network equipment (102). The network equipment (102) may include a number of switches (102). The switches (103) may include ToR switch A (103-1) and ToR switch B (103-2). As mentioned above, the switches (103) may be a computer networking device that connects devices together on a network by using packet switching to receive, process, and forward data to a destination device. Further, the switches (103) may be 1 unit (U).

Further, each of the switches (103) may include a switch ASIC (112). For example, ToR switch A (103-1) includes switch A ASIC (112-1). ToR switch B (103-2) includes switch B ASIC (112-2). The switch ASICs (112) may control logic of the switches (103). As a result, the switch ASICs (112) may control the logical flow of receiving, processing, and forwarding packets of data to a destination device, such as a user device or a server.

Further, each of the switches (103) may include PSEs (104). For example, ToR switch A (103-1) includes PSE A (104-1). ToR switch B (103-2) includes PSE B (104-2). As mentioned above, each of the PSEs (104) may provide PoE on a network cable (110). In some examples, the PSEs (104) detect if power is needed, how much power is needed, and provide PoE on a port by port basis. Further, the PSEs (104) are managed to avoid over commitment and to distribute PoE evenly. As will be described below, for a NIC with a dual port, PoE can be taken from either port or from both ports. If the PSEs (104) of the switches (103) provide PoE to two ports of the NIC (108), each of the switches' PSEs provides half the needed power to the NIC (108).

As illustrated, each of the switches (103) includes Ethernet downlink ports (114). For example, ToR switch A (103-1) includes Ethernet downlink port A (114-1). ToR switch B (103-2) includes Ethernet downlink port B (114-2). In some examples, each of the switches (103) may contain eighty or more Ethernet downlink ports and enough uplinks for a one to three bandwidth oversubscription ratio. As illustrated, the Ethernet downlink ports (114) connect the network cable (110) to connectors (116) of the NIC (108). As a result, the PSEs (104) of the switches (103) are connected to the NIC (108) via connectors (116) and the network cable (110).

Further, the system (150) includes a server (106). The server (106) facilitates the user devices to share data, information, or hardware resources. Further, the server (106) may be connected to the user devices via a network.

As illustrated, the server (106) includes the NIC (108). In some examples, NICs are connected in pairs on the server (106) for fail redundancy. As mentioned above, the Ethernet downlink ports (114) are connected, via the network cable (110), to the connectors (116) of the NIC (108). As illustrated, the NIC includes two connectors (116). As a result, the NIC (108) may be a NIC with a dual port.

As mentioned above, the NIC (108) may include a number of connectors (116). The connectors (116) are used to connect the Ethernet downlink ports (114) to the connectors (116) of the NIC (108) via the network cable (110). In some examples, the connectors may be RJ-45 connectors, small form-factor pluggable (SFP) connectors, RCx2 connectors, or other connectors. When the connectors (116) of the NIC (108) are connected to the Ethernet downlink ports (114), they will indicate how much power is need using institute of electrical and electronics engineers (IEEE) standard PoE protocols. More information about the connectors (116) will be described in other parts of this specification.

The NIC (108) may further include a PD (118). The PD (118) may be circuitry that is used to provide power to portions of the NIC ASIC (111). The PD (118) may receive PoE from a switch's PSE via the network cable (110). As a result, the PD (118) supports the NIC ASIC (111) for discovery and to change the configuration settings. As will be described in other parts of this specification, the PD (118)

on the NIC (110) indicates, via a current feedback, the power class of a powered device. The power class may be a very low power class 1 powered device or a lower power class 2 powered device.

Further, the NIC may include the NIC ASIC (111). As illustrated the PD (118) may be connected to the NIC ASIC (111). The NIC ASIC (111) may control the logic of the NIC (108). As a result, the NIC ASIC (111) may provide functionality to the NIC (108). More information about the NIC (108) will be described in other parts of this specification.

As illustrated, the NIC ASIC (111) may be connected to a baseboard management controller (BMC) (120) of the server (106) via a number of connectors (122) and a cable (124). The BMC (120) may be a specialized microcontroller embedded on the motherboard of the server (106). The BMC (120) manages the interface between system management software and platform hardware. Further, different types of sensors built into the server (106) report to the BMC (120) on parameters such as temperature, cooling fan speeds, power status, operating system (OS) status, other parameters, or combinations thereof. The BMC (120) monitors the sensors and can send alerts to a system administrator via a network if any of the parameters do not stay within preset limits, indicating a potential failure of the server (106).

An overall example will now be described with reference to FIG. 18. The initial state of the server (106) may be in stand-by mode with auxiliary power distributed to the BMC (120) and selected PCIe slots. When the connectors (116) of the NIC (108) are connected via the network cable (110) to the PSEs (104) of the switches (103), they will indicate how much power they need using IEEE standard protocols. The PSE (104) detects if power is needed, how much power, and provide PoE on a port by port basis to the connectors (116) of the NIC (108). For example, PSE A (104-1) provides half the PoE that the NIC (108) needs. Further, PSE B (104-2) provides the other half of the PoE that the NIC (108) needs. The PD (118) provides a higher PoE voltage to a regulator that lowers the voltage suitable for the NIC components (108). When the NIC ASIC (111) receives PoE, it executes a built in self-test (BIST) and awaits further configuration settings and set up instructions. Since the server (106) is still in stand-by mode, the NIC (108) executes configuration settings and set up prior to a first boot. As a result, the server (106) does not need to be restarted or rebooted for the configuration settings and set up to take effect.

FIG. 2A is a diagram of a NIC, according to one example of principles described herein. As will be described below, the NIC is used for receiving PoE from a switch to change configuration settings prior to a server booting from a stand-by mode. The NIC further includes a NIC ASIC with a NC-SI. Further, the NIC includes a PD.

As illustrated, the NIC (108) includes a PD (118). The PD (118) may be circuitry that supports a NIC ASIC (111) for discovery and to change of the configuration settings. As will be described in other parts of this specification, the PD (118) on the NIC (110) indicates, via a current feedback, a class device. The class device may be a very low power class 1 powered device with a power range of 0.44 to 3.83 watts (W). For higher speed links such as quad small form-factor pluggable (QSFP) 28, the NIC ASIC may need more power. This puts the NIC ASIC into the lower power class 2 powered device power range between 0.84 to 6.49 W. As a result, the PD (118) of the NIC (108) determines, via a current feedback, a class device of components of the server.

As illustrated, the NIC (108) includes a NIC ASIC (111). As mentioned above, the NIC ASIC (111) may control the logic of the NIC (108). As a result, the NIC ASIC (111) may provide functionality to the NIC (108). In some example, the PD (118) provides power to the NIC ASIC (111) for discovery and to change the configuration settings. The configuration settings of the NIC may include, but not limited to, partitioning, scheduling, policies, resource adjustment, initial configuration, and network boot parameters. This allows the switch management to discover the type of device and changes its configuration setting prior to the server booting.

Further, the NIC ASIC (111) may include a NC-SI (230). The NC-SI (230) may be a NC-SI reduced media-independent interface (RMII) port. The NC-SI (230) is an electrical interface and protocol which enables the connection of a BMC to a set of NICs in a server for the purpose of enabling out-of-band remote manageability. Out-of-band management includes the use of a dedicated channel for managing network devices. This allows a network operator to establish trust boundaries in accessing the management function to apply it to network resources. It also can be used to ensure management connectivity, including the ability to determine the status of any network component, independent of the status of other in-band network components. More information about the NIC (108) will be described in other parts of this specification.

Figure 2B:
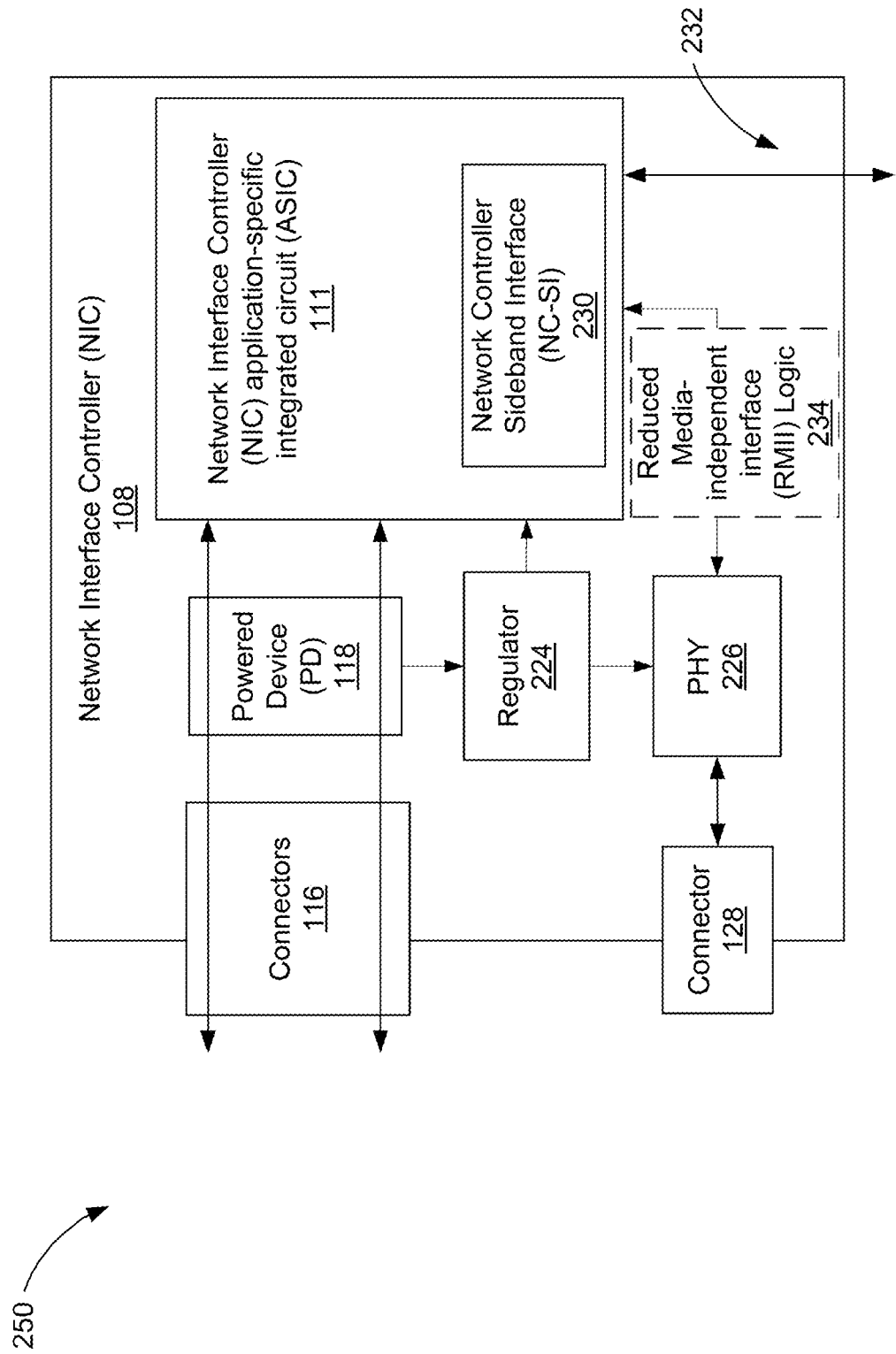
FIG. 2B is a diagram of a NIC, according to one example of principles described herein.

FIG. 2B is a diagram of a network interface controller (NIC), according to one example of principles described herein. As will be described below, the NIC includes connectors for receiving PoE from a switch to change configuration settings prior to a server booting from a stand-by mode. The NIC further includes a NIC ASIC with a NC-SI. Further, the NIC includes a PD.

As illustrated, the NIC (108) includes connectors (116). As mentioned above, the connectors (116) may allow the NIC (108) to be connected to a PSE of a switch via a network cable. The connectors may be a pair of SFP28 sockets, an RJ-45 or an RCx2 connector. The SFP28 and RCx connectors support two ports of 10 Gigabyte (Gb) and/or 25 Gb rates. As a result, the connectors (116) may receive PoE from a switch via the network cable.

As illustrated, the NIC (108) may include a regulator (224). After the PSE of the switch decides to supply PoE to the NIC (108), the PD (118) provides PoE voltages to the regulator (224). The regulator (224) distributed lower voltage power to the NIC ASIC (111), its necessary non-volatile memory (NVM), and a PHY (226). In some examples, the regulator (224) may provide a direct current (DC) voltage.

Further, the NIC (108) may include the PHY (226). The PHY (226) may be a 100Base-T PHY. The PHY (226) may be connected to the regulator (224), a connector (128), and the NC-SI (230). The PHY (226) may be the circuitry need to implement physical layer functions. A PHY connects a link layer device such as a media access control MAC to a physical medium such as a twisted pair copper cable. The PHY (226) includes a physical coding sublayer (PCS) and a physical medium dependent (PMD) layer. The PCS encodes and decodes the data that is transmitted and received. The encoding makes it easier for a receiver to recover a signal.

For the PHY (226) to connect to the NC-SI (230), the NIC (108) may include RMII logic (234). The RMII logic (234) may include hardware and computer program code implemented on a processor to allow the PHY (226) to connect to the NC-SI (230). In some examples, the RMII logic (234) may be a state machine or include pre-configuration such that the PHY (226) can communicate with the NC-SI (230).

The NIC (108) may further include the connector (128). As illustrated in FIG. 2B, the connector (128) may allow the NIC (108) to connect to a BMC of a server. The connector (128) may be an RJ-45 connector. If the PHY (226) detects link on the connector (128), the NIC (108) will set up an edge virtual bridging (EVB) S-channel for sideband management traffic on the server's BMC. As a result, it provides an in-band, yet isolated S-channel for management traffic to the server's BMC. This allows the switches (103) to connect to the server's proprietary BMC interface. Further, the NIC ASIC (111) may connect to other components via a I/O bus (232) such as PCI-Express.

Figure 3:
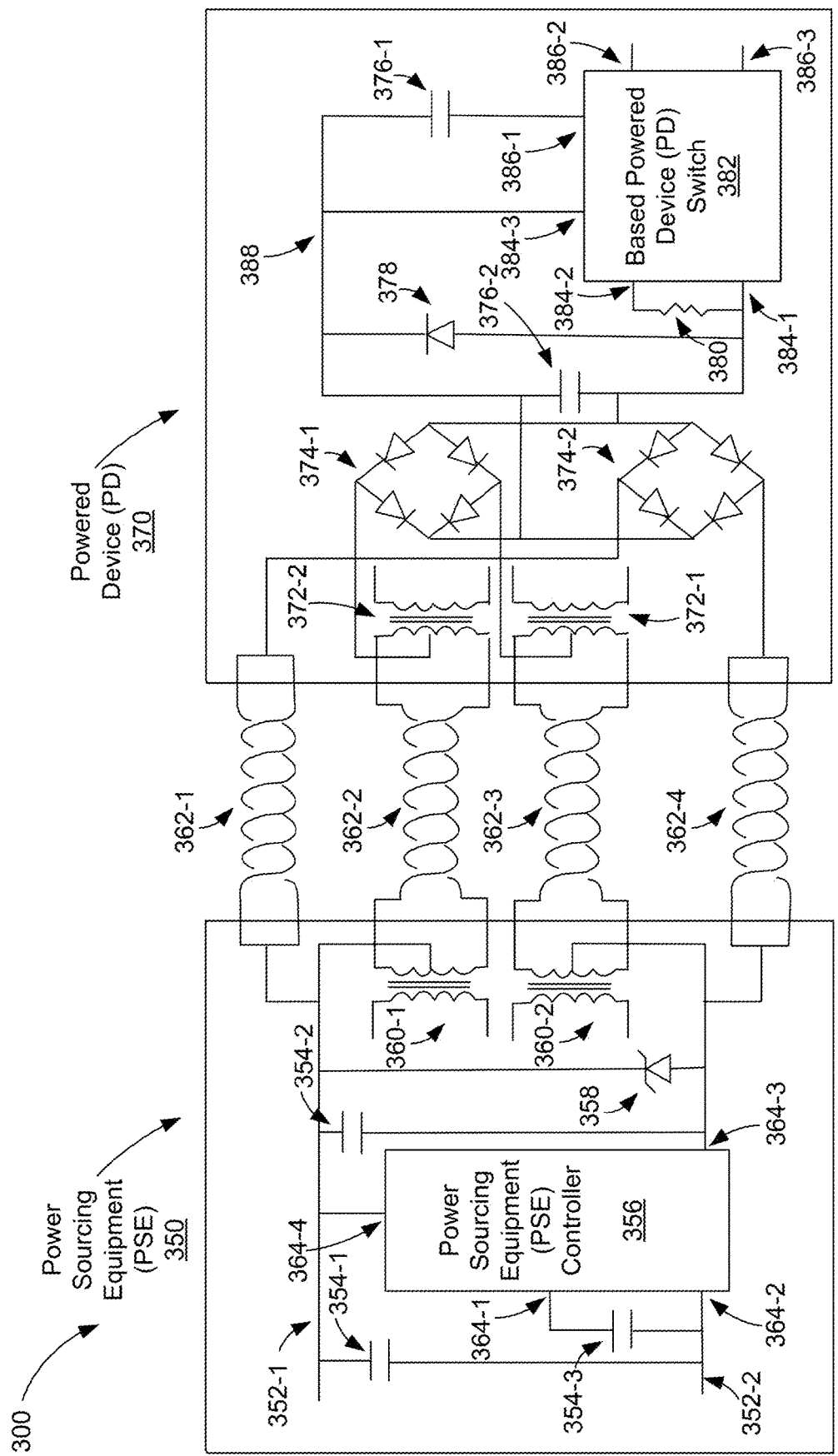
FIG. 3 is a diagram of power sourcing equipment (PSE) connected to a powered device (PD) via a network cable, according to one example of principles described herein.

FIG. 3 is a diagram of PSE connected to a PD via a network cable, according to one example of principles described herein. As will be described below, the PSE of a switch is connected to a PD of a NIC via a network cable.

As illustrated, the diagram (300) includes PSE (350). The PSE (350) may include a return voltage (352-1). The return voltage (352-1) may be −48 volts (V). The PSE (352) may include a supply voltage (352-2). The supply voltage (352-2) may be 48 V. The return voltage (352-1) and the supply voltage (352-2) may be used to power electrical components of the PSE (350).

Further, the PSE (350) may include a number of capacitors (354). The capacitors (354) include capacitor one (354-1), capacitor two (354-2), and capacitor three (354-3). Capacitor one (354-1) may be connected between the return voltage (352-1) and the supply voltage (352-2). Further, capacitor one (354-1) may be a 0.1 microfarad (uF) capacitor. Capacitor two (354-2) may be connected between the return voltage (352-1) and the supply voltage (352-2). Further, capacitor two (354-2) may be a 0.1 uF capacitor. Capacitor three (354-3) may be connected between the supply voltage (352-2) and a VDDS input (364-1) of a PSE controller (356). Further, capacitor three (354-1) may be a 0.1 uF capacitor.

The PSE (352) may include a PSE controller (356). The PSE controller (356) is an autonomous single-channel PSE controller for use in IEEE 802.3af compliant PoE systems. The PSE controller (356) includes an onboard power metal-oxide-semiconductor field-effect transistor (MOSFET), internal inrush, current limit, and short-circuit control, IEEE 802.3af compliant PD detection and classification circuitry, and selectable alternating current (AC) or DC disconnect sensing. Onboard control algorithms provide complete IEEE 802.3af compliant operation without the need of a microcontroller. The PSE controller (356) simplifies PSE implementation, needing a single 48V supply and a small number of passive support components. Programmable onboard power management circuitry permits multiple PSE controllers to allocate and share power in multi-port systems, allowing maximum utilization of the 48V power supply all without the intervention of a host processor. The port current limit can be configured to automatically adjust to the detected PD class. Detection backoff timing is configurable for either Endpoint or Midspan operation. Built-in foldback and thermal protection provide comprehensive fault protection.

As illustrated, the PSE controller's VSS input (364-2) and OUT output (364-3) are connected to the supply voltage (352-2). Further, the PSE controller's VDD48 input (364-4) is connected to the return voltage (352-1).

The PSE (352) may further include a diode (358). The diode (358) may be connected between the return voltage (352-1) and the supply voltage (352-2). Further, the diode may be bias as illustrated in FIG. 3.

The PSE (352) may include a transformer (360). The transformer (360) may be an electrical device that transfers energy between two or more circuits through electromagnetic induction. For example, between the PSE (350) and a PD (370). Commonly, transformers are used to increase or decrease the voltages of alternating current in electric power applications. The transformer (360) may include a transmitting (Tx) side (360-1) and a receiving (Rx) (360-2) side.

The diagram (300) may include a network cable (362). The network cable (362) may include two spare pairs (362-1 and 362-4). The two spare pairs (362-1 and 362-4) may be connected to the return voltage (352-1) and the supply voltage (352-2) as illustrated. In some examples, the two spare pairs (362-1 and 362-4) may or may not be used for transferring PoE to the PD (370).

The network cable (362) may further include two data pairs (362-2 and 362-3). The two data pairs (362-2 and 362-3) may be connected to the Tx (360-1) and the Rx (360-2) of the transformer as illustrated in FIG. 3. In some examples, the two data pairs (362-2 and 362-3) may be used for transferring PoE to the PD (370).

The diagram (300) further includes the PD (370). The PD (370) may include a transformer (372). The transformer (372) may include a Tx (372-1) side and an Rx (372-2) side. The network cable (362) may be connected to the Tx (372-1) and the Rx (372-2) as illustrated in FIG. 3.

As illustrated, the PD (370) may include a first rectifier (374-1). The first rectifier (374-1) maybe connected to the Tx (372-1) and the Rx (372-2) as illustrated in FIG. 3. The second rectifier (374-2) may be connected to the Tx (372-1) and the Rx (372-2) as illustrated in FIG. 3.

The PD (370) may include a first capacitor (376-1). The first capacitor (376-1) may be a 300 uF capacitor. The first capacitor (376-1) may be connected to a first node (388) and a Vout output (386-1) of a based PD switch (382).

The PD (370) may include a second capacitor (376-2). The second capacitor (376-2) may be a 0.1 uF capacitor. The second capacitor (376-2) may be connected between a Vin input (386-1) of the based PD switch (382) and the first node (388).

The PD (370) may include a diode (378). The diode (378) may be biased as illustrated in FIG. 3. Further, the diode (378) may be connected between the Vin input (386-1) of the based PD switch (382) and the first node (388).

The PD (370) may further include a resistor (380). The resistor (380) may be connected between the Vin input (386-1) of the based PD switch (382) and a Rclass input (384-2) of the based PD switch (382).

The PD (370) may include a based PD switch (382). The based PD switch (382) combines an IEEE 802.3af compliant PD interface with a current mode switching regulator, providing a complete power solution for PD applications. The based PD switch (382) integrates a 25 thousand ohm signature resistor, classification current source, thermal overload protection, signature disable and power good signal along with an under voltage lockout optimized for use with the IEEE required diode bridge. The precision dual level input current limit allows the based PD switch (382) to charge large load capacitors and interface with legacy PoE systems. The current mode switching regulator is designed for driving a 6 volt (V) rated N-channel MOSFET and features programmable slope compensation, soft-start, and constant frequency operation, minimizing noise even with light loads. The based PD switch (382) includes an onboard error amplifier and voltage reference allowing use in both isolated and non-isolated configurations.

The based PD switch (382) may include a number of inputs. The inputs may include a Vin input (386-1), the Rclass input (384-2), and a ground input (384-3).

The based PD switch (382) may include a number of outputs. The outputs may include a positive vout output (386-2) and a negative vout output (386-3).

Figure 4:
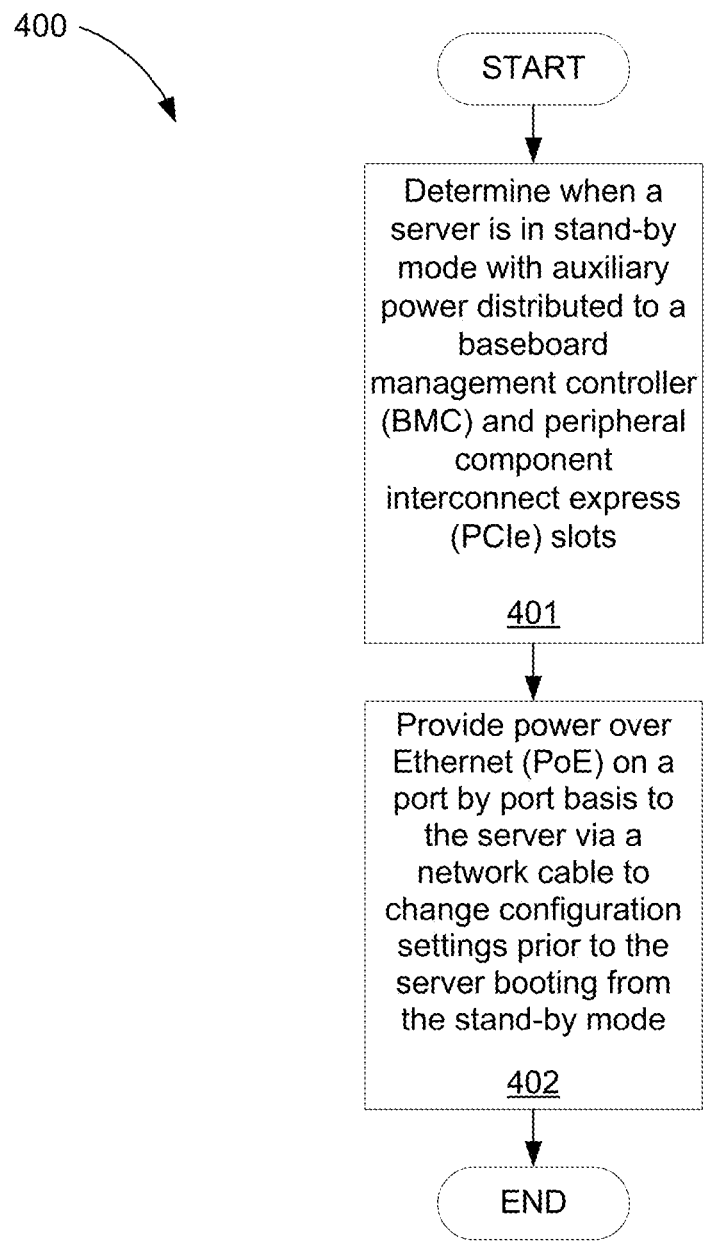
FIG. 4 is a flowchart a method for providing power to a server, according to one example of principles described herein.

FIG. 4 is a flowchart a method for providing power to a server, according to one example of principles described herein. In one example, the method (400) may be executed by the system of FIG. 1. In other examples, the method (400) may be executed by other systems such as system 150, system 200, system 250, or system 300. In this example, the method (400) includes determining (401) when a server is in stand-by mode with auxiliary power distributed to a BMC and PCIe slots and providing (402) PoE on a port by port basis to the server via a network cable to change configuration settings prior to the sever booting from a stand-by mode.

As mentioned above, the method (400) includes determining (401) when a server is in stand-by mode with auxiliary power distributed to a BMC and PCIe slots. In some examples the method (400) may interacted with components of the server to determine when the server is in stand-by mode. For example, the method (400) may utilize the NIC's power management circuitry to detect the absence of main power. Further, the method (400) may utilize the NIC's power management circuitry to detect the presents of auxiliary power.

As mentioned above, the method (400) includes providing (402) PoE on a port by port basis to the server via a network cable to change configuration settings prior to the sever booting from a stand-by mode. When the NIC ports are cabled to a pair of PSE, they will indicate how much power they need. The PoE at a switch is managed to avoid over commitment and to distribute the power evenly between a topology of the switch. For example, the PD on the NIC may indicate this it is a class 2 powered device by using a resistance value of 550 ohms per an IEEE PoE standard. As mentioned above, the configuration settings may include, but not limited to, partitioning, scheduling, policies, resource adjustment, and network boot parameters. This allows the switch management to discover the type of device and changes its configuration setting prior to the server booting.

Figure 5:
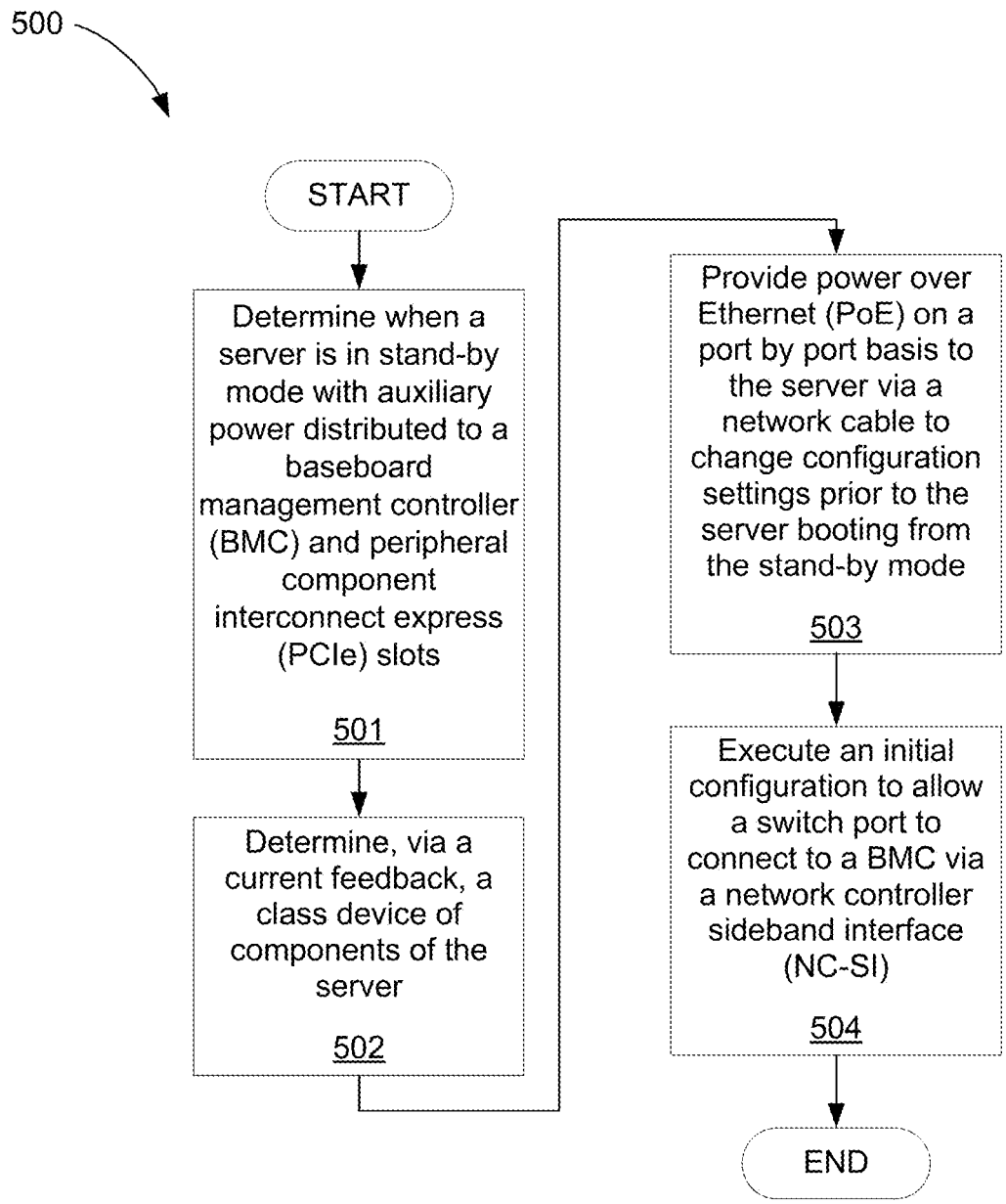
FIG. 5 is a flowchart of a method for providing power to a server, according to one example of principles described herein.

FIG. 5 is a flowchart of a method for providing power to a server, according to one example of principles described herein. In one example, the method (500) may be executed by the system of FIG. 1. In other examples, the method (500) may be executed by other systems such as system 150, system 200, system 250, or system 300. In this example, the method (500) includes determining (501) when a server is in stand-by mode with auxiliary power distributed to a BMC and PCIe slots, determining (502), via a current feedback, a class device of components of the server, providing (503) PoE on a port by port basis to the server via a network cable to change configuration settings prior to the sever booting from a stand-by mode, and executing (504) an initial configuration to allow a switch port to connect to the BMC via a NC-SI.

As mentioned above, the method (500) includes determining (502), via a current feedback, a class device of components of the server. The class device may be a class 1 powered device or a class 2 powered device as described above.

As mentioned above, the method (500) includes executing (504) an initial configuration to allow a switch port to connect to the BMC via a NC-SI. The initial configuration may be executed before or after a BIST. The initial configuration may be part of the configuration settings as described above. The initial configuration initializes to a default configuration setting with NC-SI pass-through enabled between the NIC ports and BMC. The BIST and initial configuration executes when a NIC ASIC of the server is in PoE powered mode. When the NIC ASIC receives PoE power, the method (500) initializes and detects that it is in PoE powered mode only gate power to those portions of the NIC ASIC and printed circuit assembly (PCA) components need link both ports at the lowest common speed and allow discovery and configuration via standard Ethernet protocol over the NIC's primary Ethernet ports to an embedded management processor. The standard Ethernet protocol may include a link layer discovery protocol (LLDP). As a result, the initial configuration sets up the NC-SI pass-through communication when a NIC ASIC of the server is in PoE powered mode.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for providing power to a server, the system comprising:
    a switch with power sourcing equipment (PSE), the switch comprises Ethernet downlink ports to connect the network cable to a connector of the MC and a switch application-specific integrated circuit (ASIC) to control logic of the switch; and
    a server with a network interface controller (NIC);
    the PSE to transfer power to the NIC of the server via a network cable to change configuration settings prior to the server booting from a stand-by mode or a power-off mode,
    wherein power over Ethernet (PoE) at the switch is managed to distribute the PoE evenly between a topology of the switch.

2. The system of claim 1, wherein power over Ethernet (PoE) at the switch is managed to avoid over commitment.

3. The system of claim 1, wherein a powered device (PD) supports a NIC application-specific integrated circuit (ASIC) for discovery and the change of the configuration settings.

4. The system of claim 3, wherein the PD of the NIC indicates, via a current feedback, a class device of components of the server.

5. A method for providing power to a server, the method comprising:
    determining a server is in stand-by mode or is powered oft with auxiliary power distributed to a baseboard management controller (BMC) and peripheral component interconnect express (PCIe) slots; and
    providing power over Ethernet (NE) on a port by port basis to the server via a network cable to change configuration settings prior to the server booting from the stand-by mode or from a power-off mode,
    wherein the PoE is at a switch which comprises Ethernet downlink ports to connect the network cable to a connector of the NIC and a switch application-specific integrated circuit (ASIC) to control logic of the switch.

6. The method of claim 5, wherein the PoE at a switch is managed to avoid over commitment and to distribute the PoE evenly between a topology of the switch.

7. The method of claim 5, further comprising determining, via a current feedback, a class device of components of the server.

8. The method of claim 5, further comprising executing an initial configuration to allow a switch port to connect to the BMC via a network controller sideband interface (NC-SI).

9. The method of claim 8, wherein the initial configuration sets up the NC-SI pass-through communication when a NIC application-specific integrated circuit (ASIC) of the server is in PoE powered mode.

10. A system for providing power to a server with a network interface controller (NIC), the system comprising:
- a NIC application-specific integrated circuit (ASIC) for receiving power over Ethernet (PoE) from a switch to change configuration settings prior to a server booting from a stand-by mode or a power-off mode;
- a network controller sideband interface (NC-SI) set up by the initial configuration when the NIC application-specific integrated circuit (ASIC) of the server is in PoE powered mode; and
- a powered device (PD) for supporting the NIC application-specific integrated circuit (ASIC) for discovery and the change of the configuration settings,
- wherein the PoE at the switch is managed to distributed the PoE evenly between a topology of the switch.

11. The system of claim 10, wherein the PD of the NIC determines, via a current feedback, a class device of components of the server.

12. The system of claim 10, wherein the PoE is received via network cables connected between connectors of the NIC and Ethernet downlink ports of the switch.

13. The system of claim 10, wherein the NIC ASIC is connected to a baseboard management controller (BMC) of a server.

14. The system of claim 10, wherein a number of power sourcing equipment (PSE) of the switch provide the PoE to the PD.

* * * * *